US006681880B2

(12) United States Patent
Bernhardt et al.

(10) Patent No.: US 6,681,880 B2
(45) Date of Patent: Jan. 27, 2004

(54) CONTROL LEVER

(75) Inventors: Gerd Bernhardt, Hanichen (DE); Sergiy Fedotov, Dresden (DE); Ruslan Rudik, Dresden (DE); Nicolai Tarasinski, Frankenthal (DE); Heinz Weiss, Bensheim (DE); Matthias Lang, Neulingen (DE); Jurgen Elser, Sechselberg (DE)

(73) Assignee: Deere & Company, Moline, IL (US)

(*) Notice: Subject to any disclaimer, the term of this patent is extended or adjusted under 35 U.S.C. 154(b) by 132 days.

(21) Appl. No.: 09/977,437

(22) Filed: Oct. 15, 2001

(65) Prior Publication Data

US 2002/0117017 A1 Aug. 29, 2002

(30) Foreign Application Priority Data

Oct. 20, 2000 (DE) ........................................ 100 52 050
Mar. 10, 2001 (DE) ........................................ 101 11 609

(51) Int. Cl.[7] ............................ B60K 26/00; B25J 1/00; A01B 63/04

(52) U.S. Cl. ......................... 180/315; 74/480 R; 414/5; 414/703; 172/442; 341/20; 345/161

(58) Field of Search ................................ 180/315, 333; 341/20; 345/161; 463/38; 701/50; 172/439, 442, 444; 200/6 A; 414/5, 703; 74/471 XY, 480 R

(56) References Cited

U.S. PATENT DOCUMENTS

| | | | | | |
|---|---|---|---|---|---|
| 3,091,130 | A | * | 5/1963 | Payerle et al. | 74/471 R |
| 3,432,184 | A | | 3/1969 | Tweedy | 172/272 |
| 3,904,042 | A | * | 9/1975 | Colston | 414/1 |
| 4,091,234 | A | * | 5/1978 | Bristow | 345/161 |
| 4,125,271 | A | | 11/1978 | Wiboltt et al. | 280/461 A |
| 4,216,467 | A | * | 8/1980 | Colston | 341/20 |
| 4,422,345 | A | * | 12/1983 | Green | 74/471 XY |
| 4,589,810 | A | | 5/1986 | Heindl et al. | 414/5 |
| 4,641,123 | A | | 2/1987 | Whitehead | 338/128 |
| 4,736,647 | A | * | 4/1988 | Shimoie et al. | 74/471 XY |
| 4,916,965 | A | * | 4/1990 | Wardenier et al. | 74/473.15 |
| 4,962,448 | A | * | 10/1990 | DeMaio et al. | 700/17 |
| 5,107,080 | A | * | 4/1992 | Rosen | 200/6 A |
| 5,116,180 | A | * | 5/1992 | Fung et al. | 414/5 |
| 5,223,776 | A | * | 6/1993 | Radke et al. | 318/568.1 |
| 5,263,382 | A | * | 11/1993 | Brooks et al. | 74/471 XY |
| 5,286,024 | A | * | 2/1994 | Winblad | 273/148 B |
| 5,451,134 | A | | 9/1995 | Bryfogle | 414/680 |
| 5,589,854 | A | * | 12/1996 | Tsai | 345/161 |
| 5,675,359 | A | * | 10/1997 | Anderson | 345/161 |
| 5,767,839 | A | * | 6/1998 | Rosenberg | 345/161 |
| 5,767,840 | A | | 6/1998 | Selker | 345/161 |
| 5,854,622 | A | * | 12/1998 | Brannon | 345/161 |
| 5,859,372 | A | * | 1/1999 | Neltoft | 73/862.043 |
| 6,129,155 | A | * | 10/2000 | Lombardi | 172/2 |
| 6,593,729 | B2 | * | 7/2003 | Sundin | 324/207.16 |
| 2002/0007690 | A1 | * | 1/2002 | Song et al. | 74/471 XY |

FOREIGN PATENT DOCUMENTS

| | | |
|---|---|---|
| DE | 35 04 464 C1 | 4/1986 |
| DE | 197 20 049 A1 | 11/1998 |
| DE | 199 51 840 A1 | 5/2001 |
| EP | 0 981 078 A2 | 2/2000 |
| GB | 2 308 878 A | 7/1997 |
| WO | 98/25193 | 6/1998 |

OTHER PUBLICATIONS

Hebsacker, M., in The Definition of the Kinematic of the Hexaglide.—"Methods for the Definition of Parallel Machine Tools", VDI reports No. 1427, 1998.

* cited by examiner

*Primary Examiner*—Paul N. Dickson
*Assistant Examiner*—Laura B. Rosenberg

(57) ABSTRACT

A control lever controls movement of a system to be controlled. The control lever includes a manually operable handgrip attached to a platform. At least six connecting elements are arranged between the platform and a fixed console. Length sensors sense the length of the connecting elements, and/or force sensors sense forces acting on the connecting elements. A control unit evaluates the sensor signals and generates a control signal for controlling movement of the system. The connecting elements are be arranged in the form of a hexapod. The connecting elements may be telescoping members or rigid fixed length members.

19 Claims, 4 Drawing Sheets

CONTROL LEVER

FIELD OF THE INVENTION

The invention relates to a control element or control lever for the manual control of the movements of a system to be controlled.

BACKGROUND OF THE INVENTION

It is known to use a control lever in the control of a mechanism or system, such as a lever or a joystick which may be pivoted about one or two axes. Such control levers permit a control of a mechanism with two degrees of freedom. For example, EP-A-0 981 078 describes a control lever in the form of a joystick which can be moved by means of a universal joint in two directions, to the front and the rear as well as to the left and the right. On the grip of the control lever there are two electric push-button switches for generating further control signals.

Additional control elements, such as rollers or electrical push-button switches can be integrated into a control lever for the control of the movement in more than two degrees of freedom, such as in a spatial dimension. But the operation may become complicated and ergonomically less than optimal.

SUMMARY OF THE INVENTION

An object of the present invention is to provide a control lever which permits control of more than two and up to six degrees of freedom.

An object of the present invention is to provide such a control lever which has only one handgrip, and which can be operated in all degrees of freedom, without the need for actuating additional activating elements.

An object of the present invention is to provide such a control lever which has a simple design and which operates ergonomically.

These and other objects are achieved by the present invention, wherein a control lever includes a handgrip, and is configured as a control lever which can be operated by an operator. The handgrip is fastened to a platform, so that the platform follows the movement of the handgrip, or so that forces applied to the handgrip are transmitted to the platform. At least six connecting elements are arranged between the platform and a fixed console. Furthermore, transducers or sensors are provided for detecting changes in length of the connecting elements or for sensing tension and compression forces applied to the connecting elements. Forces in six degrees of freedom may be applied to the handgrip—in three different translational directions and about three different axes of rotation. The length signals or force signals are associated with the connecting elements.

From the length signals or the force signals three coordinates and three orientation angles can be determined which represent the position of the platform with respect to the console or which represent the force vectors and moment vectors applied to the handgrip. The sensor signals represent unequivocally the position of the handgrip or the forces and moments applied to the handgrip. In the calculation of the coordinates known methods can be applied, such as described by Hebsacker, M., in The Definition of the Kinematic of the Hexaglide.—"Methods for the Definition of Parallel Machine Tools", VDI reports No. 1427, 1998.

The length or force sensor signals are evaluated by a control unit and utilized for the control of the movement of the system to be controlled. The control unit calculates the immediate position of the handgrip or the forces and moments applied to the handgrip from the sensor signals, and transmits corresponding control signals to the system that is to be controlled.

Thus, the control lever of the invention can be used for the manual control of movement of a system to be controlled, for example, as well as a virtual system. With only one control lever, movement of a system can be controlled in up to six degrees of freedom, without the need for the actuation of additional switches and the like. Thus, the system can be controlled in a simple and ergonomically favorable way.

Preferably, the connecting elements are arranged in the form of a hexapod. Hexapods have been used, for example, in measurement implements for determining the accuracy of position of machine tools (DE-A-35 04 464), in motorized coordinate measurement implements (DE-A-197 20 049) and in robot kinematics. A hexapod is an arrangement of connecting elements, that make possible movement in six degrees of freedom, and which may include six or more (for example, eight) connecting elements. By using a hexapod arrangement in connection with a control lever it is possible to move the handgrip and with it the platform in six degrees of freedom and to convert the movements unequivocally into control signals. The handgrip can be pivoted, for example, to the side in two directions, rotated about its axis, shifted to the side in two directions, and shifted inward and outward in the direction of its axis. If force sensors are used, the movements of the handgrip may be so small that they cannot be sensed by the operator. In this case the operator will not perform a definite spatial repositioning of the handgrip, but will apply forces to the handgrip that correspond to the desired control signals. Such a versatile actuation of a handgrip is not possible with control levers previously known.

The invention can be used to control mechanisms with more than two degrees of freedom. A preferred application is in connection with an attachment interface or hitch for coupling of implements to a utility vehicle, as is described in DE-A-199 51 840. This attachment interface includes six hydraulic cylinders arranged in a hexapod between a tractor and a coupling frame. The hydraulic cylinders can be controlled by the control lever of the present, wherein the signals of each length or force sensor of the control lever hexapod is used to control a corresponding hydraulic cylinder of the attachment interface hexapod.

The present invention could also be used as a so-called "three-dimensional mouse" and for the control of virtual movements, such as could be displayed on a monitor.

Preferably, the connecting elements are telescoping and are arranged in a hexapod. Each telescoping leg includes two telescoping rods that can be shifted axially relative to each other, and which have free ends which engage the platform or the console, which are free to pivot in all directions, and which are attached at attachment points which are located near the corners of a triangle. The telescoping legs are equipped with length or distance sensors which provide length signals corresponding to the length of the associated telescoping leg.

Each telescoping leg may include a cylinder housing open at both ends and which engages a slidable telescoping rod. The telescoping rods are supported by springs in their central position. By actuation of the control lever against the force of the springs, the length of the spring legs can be varied. If the control lever is released, the platform and with it the control lever returns to the central position.

Alternatively, or in addition to the springs, each telescoping rod can be guided by a friction fit in the cylinder housing, so that for a shift in length friction forces must be overcome.

The length sensors may be sliding variable resistance type sensors. But it is also possible to employ, for example, inductive, capacitative or opto-electronic length sensors.

According to a further preferred embodiment, the connecting elements are generally rigid in their length, so that they can neither be extended nor shortened by the application of axial forces. The tension and compression forces applied to the connecting elements by the actuation of the handgrip are measured by force sensors. Force sensors may, for example, be strain gages or piezo-electric sensors.

The attaching point of the connecting elements at the platform and/or at the console are located preferably near the corners of an equilateral triangle. Two connecting elements are connected near each corner, and can be pivoted in two directions. But it may also be appropriate to arrange the connecting joints approximately in the corners of a square or of a hexagon or in some other geometric shape. In a square, for example, two connecting elements can each engage two adjoining corners of the square and in each case one or two of the remaining connecting elements may be connected in joints to the other two corners of the square.

In order to avoid bending of the connecting elements, it is appropriate to pivotally connect the connecting elements with the platform and/or with the console. As a result of such pivotal connections, the connecting elements experience only tension and compression forces, so that the structure remains statically determinate. The forces can be detected by force sensors or by the measurement of a change in length of the connecting elements.

In the case of force sensors, it is advantageous to fasten the connecting elements rigidly to the console and to pivotally connect them to the platform. Preferably, for each of the pivotal connections, one or more rubber-like elements are employed, that permit a tilting to the side of the connecting elements with respect to the platform, but are sufficiently rigid to transmit tension and compression forces.

Particularly preferably, the platform includes bending elements to each of which a rigid connecting element is engaged, and that bend upon loading by forces or moments of the handgrip. The bending elements are preferably configured as rods or brackets and with at least one end connected rigidly to the platform. The rods are arranged transverse to the length of the connecting elements. The term transverse includes other angles besides a rectangular configuration between the directions of the bending element and the connecting element. Most appropriately, the bending elements have only one end connected to the platform and extend to a free end to the side of the platform.

With two or more connecting elements engaged at the corners of a platform, such as a triangular platform, it is advantageous to provide near each of the corners rods or brackets configured as bending elements arranged alongside each other and generally extending parallel to each other. A connecting element engages near the free end of each rod or each bracket. The brackets may be configured, for example, in such a way that the platform is slit in its corners and the slits are directed generally towards the center of the platform.

Preferably, at least on the upper side or on the underside of a bending element (for example, a bracket) a strain gage is arranged, oriented generally in the radial direction, that is, toward the center of the platform, in the region between the attachment point of the connecting element and the central region of the platform. The upper side and the underside of the bending element defines surfaces of the bending element that extend generally transverse to the length of the connecting elements.

For temperature compensation and signal amplification, strain gages are mounted on the upper side as well as on the underside of a bending element. The two strain gages are connected into a half bridge circuit. The half bridge circuit can be supplemented to a full bridge internally within an amplifier which generates an output signal in form of a bridge detuning.

A bridge voltage can be conducted to an amplifier which is integrated into a micro-controller. For example, six output voltages may be generated for six connecting elements from six associated amplifiers, which are a measure of the forces generated in the connecting elements. The micro-controller could also perform an entire calculation of the geometry, convert the output signals into force and moment components, and transmit such data over a bus connection, for example, a CAN bus. The absolute value of each force and moment component may represent a desired velocity of the movement of the system to be controlled. The directions of the forces represent the direction of the translation, and the direction of the moments represent the direction of the rotation of the system.

In order to guarantee reliable signal processing and to reduce the cost of wiring, it is appropriate to arrange elements and associated evaluation electronics on the platform. The evaluation electronic can be provided with integrated semiconductor elements, such as is normal practice for pressure and acceleration sensors.

Preferably, the control lever is in the form of a joystick. It is particularly appropriate to configure the handgrip in the form of an angle lever in which one leg extends, vertically away from the platform and the other free leg extends generally at a right angle directed generally parallel to the platform. In a non-actuated rest position, the free leg extends upward and can be actuated comfortably by an operator within the frame of six degrees of freedom.

For additional function capability, a control element is arranged near the free end of the handgrip, such as, for example, a switch or push-button which can be actuated by a finger or the thumb, by means of which an electric switch is actuated. Or, a roller may be connected with an electric analog transmitter. An activating flap can also be mounted on the handgrip, such as described in DE-A-0 981 078. By means of control elements of this type safety requirements can be met and further function can be controlled, without the need for the operator to remove his hand from the handgrip. Furthermore, the control element can be integrated into the method of operation so that the system to be controlled can be moved by actuation of the handgrip only when an operating switch integrated into the handgrip is actuated. In this way an unintended actuation of the system to be controlled can be avoided, for example, during travel.

Preferably the output characteristic of the control unit depends in a nonlinear manner on the tension and compression forces measured, so that in a linear increase of the bending force provides a non-linear operating velocity as input for the system to be controlled. By a corresponding change to the output characteristic it is possible to control a response level for the system.

From the six measurement magnitudes (measured values of length or force) the forces or the lengths can be calculated in any desired coordinate system by coordinate transformation. In particular, the magnitudes of the forces in the principal axes of the handgrip can be determined. From these the magnitudes of movement (for example, target velocities in each of the directions) of the structure to be controlled are calculated. Such a control lever can be used to control a system configured as a hexapod, such as a hexapod hitch system of a utility vehicle.

If the controlled system is a hexapod hitch or implement attachment, then preferably, the hexapod geometry of the control lever will conform to the geometry of the hexapod hitch system. For example, the lengths and pivot points of the telescoping legs can be in a fixed relationship to the lengths and pivot point locations of the drive elements of the hexapod system, so that the kinematics of the two hexapod arrangements are similar or identical to each other. Thereby, lengths or changes in length of the telescoping legs can be transferred directly to the drive element, for example, the hydraulic cylinder strokes of the system to be controlled and the cost of programming a control unit can be reduced.

Preferably, the control unit generates control signals which are used to control a coupling arrangement, such as a coupling triangle of a vehicle attachment arrangement or hitch. Thereby, the operator can operate the coupling triangle from the vehicle platform as desired, in order to perform coupling operations, or to move a coupled implement. The control lever can also be used to control a vehicle power lift, such as a front power lift. The control lever can also be used to control a vehicle component, in which case the console of the control lever is part of a vehicle console which is part of a vehicle operator's platform.

DESCRIPTION OF THE PREFERRED EMBODIMENT

Figure 1:
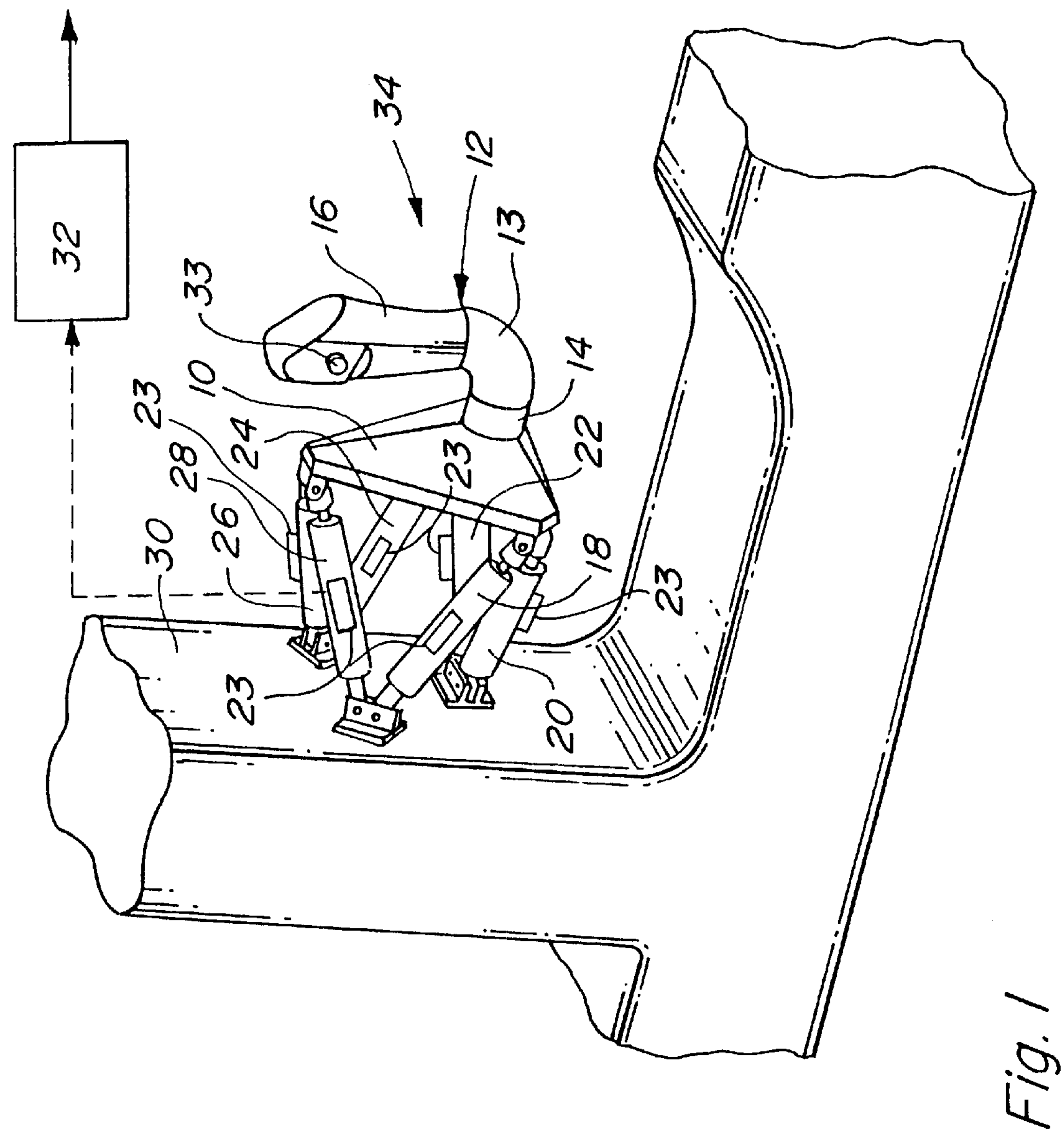
FIG. 1 is a perspective view of a control lever of the present invention, mounted on a vehicle console.

According to FIG. 1, a joystick-like control lever 12 is fastened to a platform 10, and is shown in its non-actuated rest position. The control lever 12 has a first leg 14 which extends generally perpendicular to the platform 10 and a second leg 16 which extends upwardly and generally perpendicular to leg 14. The second leg 16 is an ergonomically configured operating handgrip and permits comfortable operation.

The platform 10 is shaped generally as an equilateral triangle, with one corner directed upward. Near each corner of the triangle are pivotally coupled the first ends of two telescoping legs 18, 20, 22, 24, 26, 28. Each of the other ends of the telescoping legs 18, 20, 22, 24, 26, 28 are pivotally coupled to a vehicle console 30 (shown only partially). The coupling points of the second ends are also arranged generally in an equilateral triangle, which is rotated 60 degrees relative to the platform triangle, so that one corner of this triangle lies downward. The connecting joints between the telescoping legs 18, 20, 22, 24, 26, 28 and the platform 10 and the console 30 permit the legs 18, 20, 22, 24, 26, 28 to be pivoted in all directions.

The legs 18, 20, 22, 24, 26, 28 are arranged in a hexapod between the platform 10 and the console 30. Each leg 18, 20, 22, 24, 26, 28 includes two telescoping rods that can be shifted axially relative to each other. Each leg also includes a length sensor 23 which detects the length of the leg 18, 20, 22, 24, 26, 28 and transmits a corresponding length signal to a control unit 32.

A control element or a push-button switch 33 is mounted on a side of the second leg 16 of the control lever 12. In order to avoid an unintended operation, the control unit 32 transmits output signals only if the push-button switch 33 is actuated.

Figure 2:
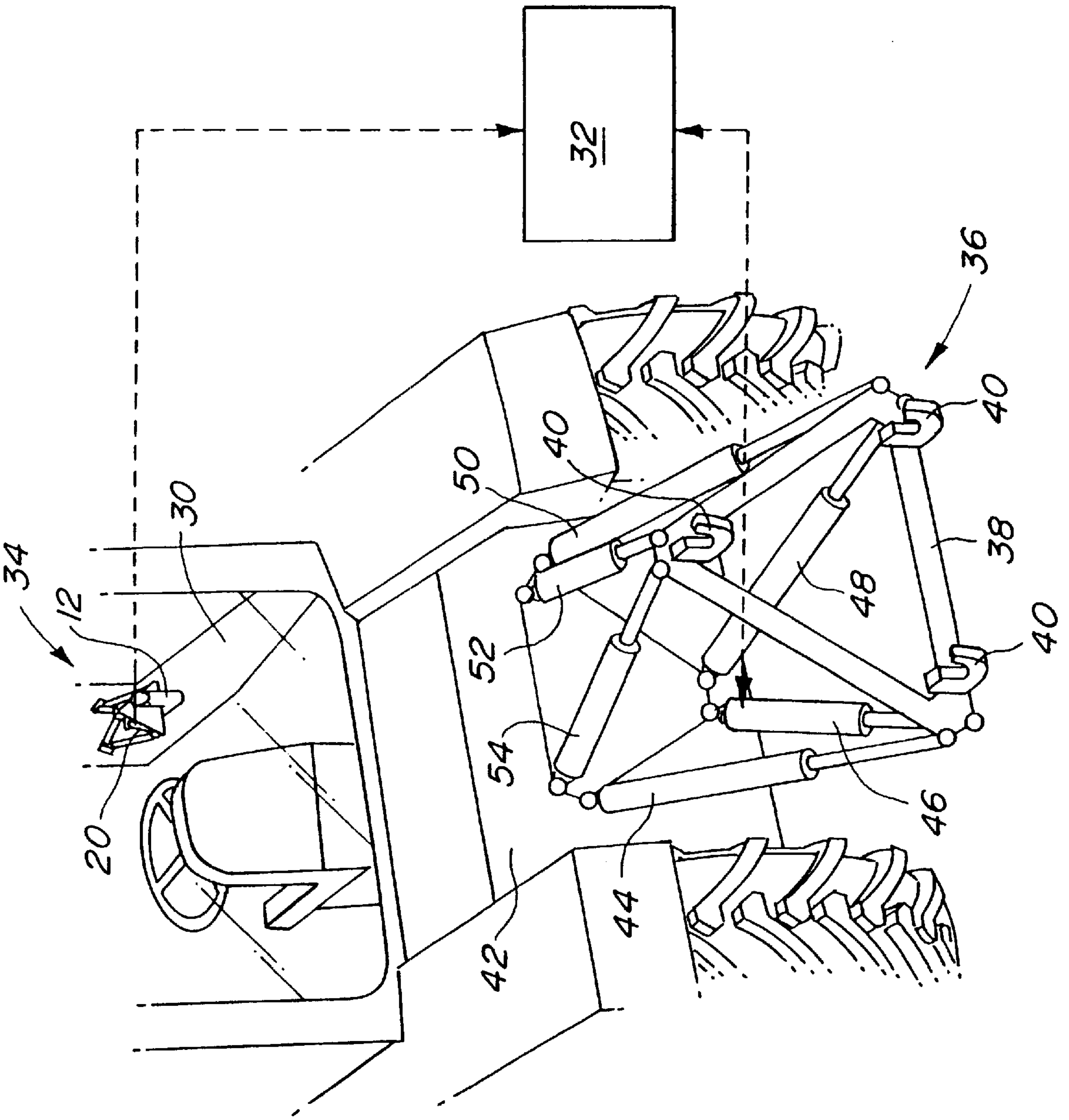
FIG. 2 is a rear perspective view of a tractor with an implement attachment interface and a control lever according to the invention.

FIG. 2 shows the control lever 34 mounted on a right hand console 30 in a vehicle cab, where it is easily accessible to the operator. A system 36 to be controlled is preferably an implement attachment, coupling interface or hitch 36, such as described in DE-A-199 51 840, is mounted on the rear of the tractor 42. The hitch 36 includes a coupling frame 38 with hooks 40 for engaging with an implement (not shown). Six hydraulic cylinders 44, 46, 48, 50, 52, 54 extend between the coupling frame 38 and the tractor 42, and are arranged and actuated in the manner of a hexapod. The coupling joints of the hydraulic cylinders and their lengths are in a fixed proportional relationship to the coupling joints and lengths of the legs 18, 20, 22, 24, 26, 28 of the control lever 34.

This geometry simplifies the control of the attachment interface 36, whose position and movement is to follow the position and the movement of the control lever 34. The control unit 32 determines the measurement value of each length sensor and transmits proportional control signals to the hydraulic cylinders 44, 46, 48, 50, 52, 54. For example, the measurement signal of the telescoping leg 20 is converted by the control unit 32 into a control signal for the hydraulic cylinder 46.

Figure 3:
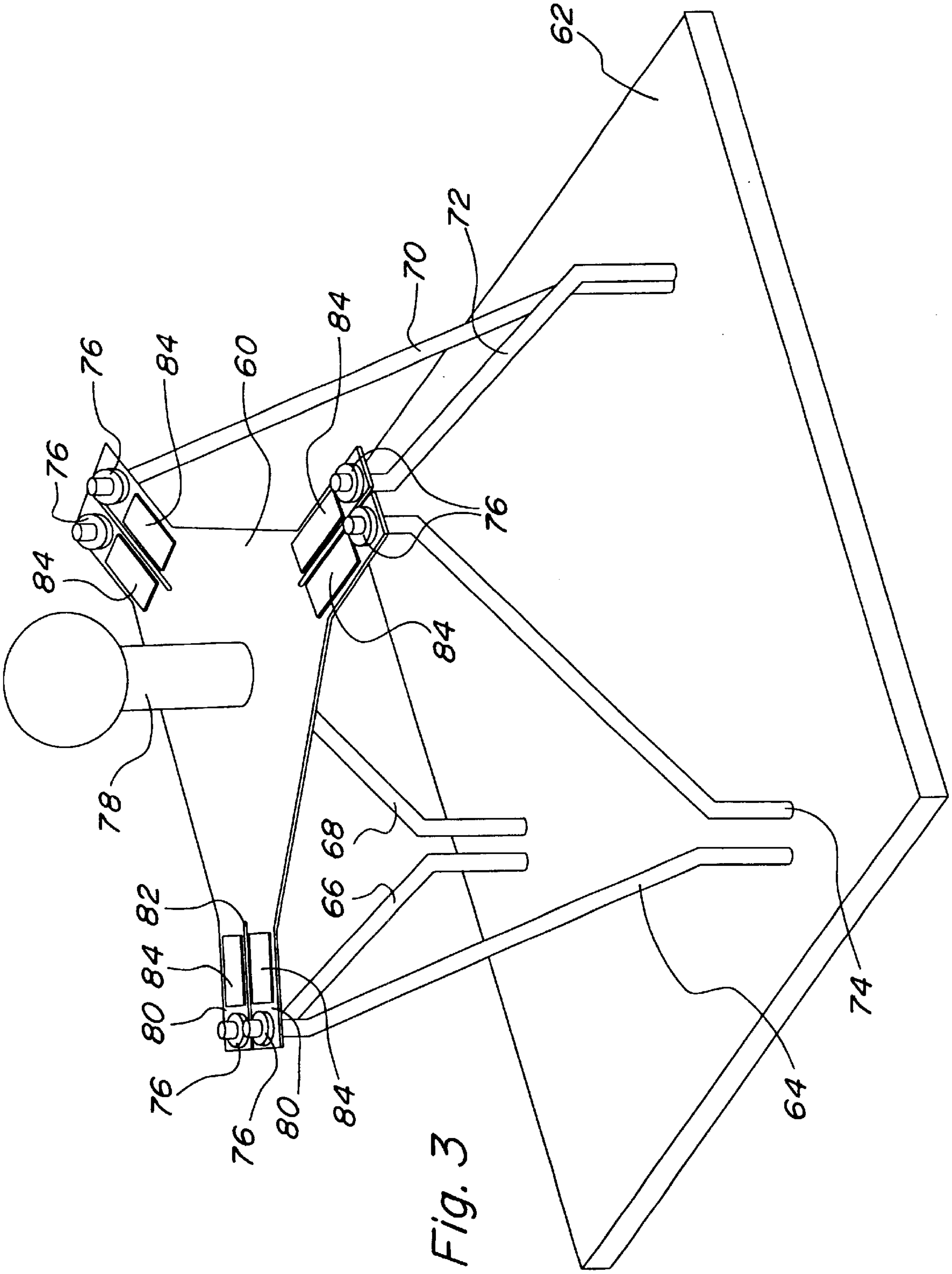
FIG. 3 is a perspective view of a further embodiment of the control lever of the present invention, mounted on an attachment plate.

FIG. 3 shows an alternative embodiment of the control lever. In this embodiment rigid connecting rods 64, 66, 68, 70, 72, 74 extend between a generally triangular shaped platform 60 and an attachment plate 62. The connecting rods 64, 66, 68, 70, 72, 74 are coupled in pairs to points near to the corners of equilateral triangles. The rods 64, 66, 68, 70, 72, 74 are rigidly connected to the plate 62 and are flexibly connected with the platform 60 through a rubber element 76.

A handgrip 78 is fastened to the center of the level platform 60 and extends perpendicularly to the platform 60. The handgrip 78 (which is shown only schematically) preferably is ergonomically configured and includes additional actuation elements (not shown), such as described in connection with FIG. 1.

Two parallel extending brackets 80 are separated from each other by a slit 82 and extend from the three corners of the platform 60. The brackets 80 and the slits 82 are oriented towards the center of the platform 60, and towards the handgrip 78, and transverse to an axis of the connecting elements. One end of each connecting rod 64, 66, 68, 70, 72, 74 is fastened to a free end of each bracket 80 through an intervening rubber element 76.

As can be seen in FIG. 3, an upper strain gage 84 is fastened on the upper side of each bracket 80. The strain gages 84 are oriented parallel to the brackets 80 with their long dimension oriented toward the center of the platform 60. The strain gages 84 are positioned on each bracket 80 between the rubber element 76 and the end of the slit 82 facing the center of the platform. Forces applied from a bracket 80 to a corresponding rod 64, 66, 68, 70, 72, 74 as a result of actuation of the handgrip 78, produce a corresponding bending of the bracket 80 upward or downward and thereby a corresponding change in the resistance in the strain gage 84. Although not visible in FIG. 3, lower strain gages 86 are mounted on a rear side of each bracket 80 opposite each upper strain gage 84.

Figure 4:
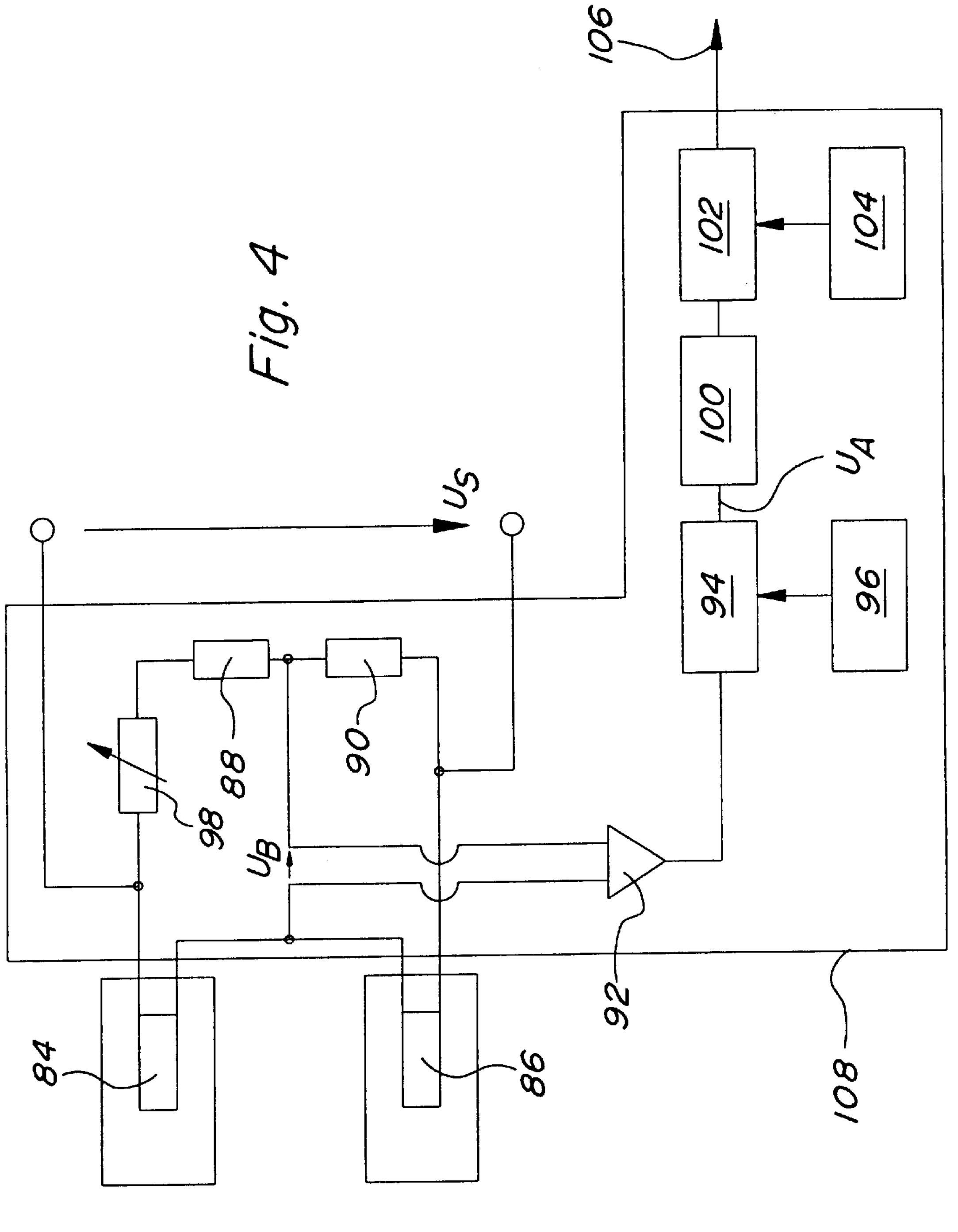
FIG. 4 is a schematic diagram of a signal processing system.

Referring now to FIG. 4, an upper strain gage 84 and a lower strain gage 86 are connected together in a half bridge. The half bridge is supplemented to a full bridge by three resistors 88, 90, 98. The resistor 98 is an adjustable resistor by means of which a manual, rough zero compensation of the bridge circuit can be performed. A bridge supply voltage Us is applied to the series connected strain gages 84, 86. The bridge circuit generates a bridge voltage UB between a center tap between the two strain gages 84, 86 and a center tap between the two supplementary resistors 88, 90. Connecting the strain gages 84, 86 in a bridge circuit results in a temperature compensation between the upper and lower sides of the platform 60. Due to the use of two strain gages 84, 86 for each bracket 80, the output signal is doubled as compared to only one strain gage.

The bridge voltage UB is amplified by an amplifier 92 and then communicated to a signal processor 94. The signal processor 94 is connected with a zero compensation unit 96. Zero compensation could be accomplished by a programmed computer-based unit. Through the integrated zero compensation the drift of the measurement amplifier 92 as well as small plastic changes in the system or voltage variations can automatically be equalized. The automatic zero compensation is performed only if no actuation of the control lever is to occur and therefore the activating switch arranged at the operating handgrip 78 is not actuated. The output voltage UA of the signal processor 94 is a measure of the force in each of the connecting rods 64, 66, 68, 70, 72, 74. For each pair of strain gages 84, 86 an output voltage UA is generated.

The output voltage UA of the strain gage pairs 84, 86 is received by a geometry calculating unit 100, which converts the measurement signals into force and moment components. The calculation of the force components Fx, Fy, Fz and the moment components Mx, My, Mz is performed in the usual manner by coordinate transformations from each geometry (direction) of the connecting rods 64, 66, 68, 70, 72, 74 and according to the force measurement values of the strain gages 84, 86. Calculations produce the force Fx in direction x, force Fy in direction y, force Fz in direction z, moment Mx about the x axis, moment My about the y axis and moment Mz about the z axis. The magnitude of the forces is a measure of the velocity with which the system 36 should be moved, while the direction of the forces represents the direction of the translation and the direction of the moments represents the rotation of the system.

The output signals of the geometry calculation unit 100 are non-linearly transformed by an output signal processor 102 as a function of characteristic curves or relationships stored in memory 104, and then transmitted to a CAN bus 106. The output signal processor 102 generates an output signal only when the control lever 78 is actuated and a switch (not shown) thereon is actuated.

The supplementary resistors 88, 90, 98, amplifier 92, input signal processor 94 and zero compensation unit 96 associated with each pair of strain gages 84, 86 may be combined together with the geometry calculation unit 100, the output signal processor 102 and the characteristics memory 104 into an integrated component 108. This component 108 is preferably fastened to the rear side of the platform 60. Alternatively, the component 108 may be mounted in an external controller housing.

Although the invention has been described in terms of only two embodiments, anyone skilled in the art will perceive many varied alternatives, modifications and variations in the light of the above description as well as the drawings, all of which fall under the present invention.

What is claimed is:

1. A control lever for controlling movement of a system to be controlled, the control lever comprising:

a manually operable handgrip coupled to a platform, the platform including bending elements;

a plurality of connecting elements which couple the platform to a fixed console, each connecting element being a rigid member, and each connecting element being coupled to a corresponding bending element so that the bending element bends in response to movement of the handgrip;

a plurality of sensors, each sensor being associated with a corresponding one of the connecting elements and generating a parameter signal associated with the corresponding connecting element; and a control unit for processing the parameter signals and generating a control signal for controlling the system.

2. The control lever of claim 1, wherein:

the connecting elements are arranged in a hexapod configuration.

3. The control lever of claim 2, wherein:

the system to be controlled is configured as a hexapod.

4. The control lever of claim 3, wherein:

the hexapod arrangement of the control lever has a geometry which is similar to a geometry of the hexapod configuration of the system to be controlled.

5. The control lever of claim 1, wherein:

each connecting element is a telescoping member.

6. The control lever of claim 1, wherein:

pairs of the connecting elements are coupled to the platform at coupling points which are positioned near corners of a triangle.

7. The control lever of claim 1, wherein:

the connecting elements are rigidly fastened to the console.

8. The control lever of claim 1, wherein:

the connecting elements are coupled to the platform through flexible members.

9. The control lever according to claim 1, wherein:

each bending element has one end rigidly coupled to the platform, and each bending element is oriented transverse to an axis of the connecting elements.

10. The control lever of claim 1, wherein:

the handgrip is configured as a joystick.

11. The control lever of claim 1, wherein:

the handgrip comprises a lever projecting from the platform, the lever having a free end which extends generally upwardly.

12. The control lever of claim 1, wherein:

a control element is mounted near to a free end of the handgrip.

13. The control lever of claim 1, wherein:

the system to be controlled comprises a vehicle attachment interface.

14. The control lever of claim 1, wherein:

the console is part of a vehicle operator's platform; and the system to be controlled is a vehicle component.

15. The control lever of claim 1, wherein:

each sensor comprises a length sensor for sensing a length of the connecting element.

16. A control lever for controlling movement of a system to be controlled, the control lever comprising:

a manually operable handgrip coupled to a platform, the platform having a triangular shape with three corners, each corner having a pair of flexible brackets projecting therefrom and extending alongside each other;

a plurality of connecting elements which couple the platform to a fixed console, each connecting element being coupled to one of the brackets;

a plurality of sensors, each sensor being associated with a corresponding one of the connecting elements and generating a parameter signal associated with the corresponding connecting element; and a control unit for processing the parameter signals and generating a control signal for controlling the system.

17. The control lever of claim 16, wherein:

a strain gage is mounted on a side of each bracket, each strain gage being positioned between the connecting element and a central region of the platform.

18. The control lever of claim 16, wherein:

each sensor comprises a pair of strain gages are mounted on opposite sides of each bracket, and each pair of strain gages being connected in a half bridge circuit.

19. A control lever for controlling movement of a system to be controlled, the control lever comprising:

a manually operable handgrip coupled to a platform;

a plurality of connecting elements which couple the platform to a fixed console;

a plurality of sensors, each sensor being associated with a corresponding one of the connecting elements and generating a parameter signal associated with the corresponding connecting element, each sensor comprises a force sensor, and the sensors and an associated electronic evaluation unit are mounted on the platform; and a control unit for processing the parameter signals and generating a control signal for controlling the system.

* * * * *